US012204944B2

United States Patent
Teixeira de Abreu Pinho et al.

(10) Patent No.: US 12,204,944 B2
(45) Date of Patent: Jan. 21, 2025

(54) SYSTEMS AND METHODS FOR WORKLOAD PLACEMENT BASED ON SUBGRAPH SIMILARITY

(71) Applicant: EMC IP Holding Company LLC, Hopkinton, MA (US)

(72) Inventors: Rômulo Teixeira de Abreu Pinho, Niterói (BR); Vinicius Michel Gottin, Rio de Janeiro (BR); Eduardo Vera Sousa, Niterói (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 465 days.

(21) Appl. No.: 17/505,820

(22) Filed: Oct. 20, 2021

(65) Prior Publication Data

US 2023/0121060 A1 Apr. 20, 2023

(51) Int. Cl.
*G06F 9/50* (2006.01)
*G06F 9/48* (2006.01)
(Continued)

(52) U.S. Cl.
CPC .............. *G06F 9/505* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/50; G06F 9/5005;
(Continued)

(56) References Cited

U.S. PATENT DOCUMENTS

| 10,970,113 B1* | 4/2021 | Kurtzer | G06F 9/5005 |
| 2013/0185433 A1* | 7/2013 | Zhu | H04L 43/0876 |
| | | | 709/226 |

(Continued)

OTHER PUBLICATIONS

H. Qiu, S. S. Banerjee, S. Jha, Z. T. Kalbarczyk and R. K. Iyer, "FIRM: An Intelligent Fine-Grained Resource Management Framework for SOL-Oriented Microservices," in Symposium on Operating Systems Design and Implementation, 2020.

(Continued)

*Primary Examiner* — Charles M Swift
(74) *Attorney, Agent, or Firm* — Chamberlain, Hrdlicka, White, Williams & Aughtry; Aly Dossa

(57) ABSTRACT

Techniques described herein relate to systems and methods for workload placement based on subgraph similarity. Such techniques may include obtaining an encoded workload graph based on receiving a workload execution request; using the encoded workload subgraph to obtain encoded graphs representing previous workload executions, encoded subgraphs representing infrastructures on which the workload were executed, resource usage information, and execution metrics; using the encoded infrastructure subgraphs using subgraph similarity to identify candidate infrastructure subgraphs, using an ML model to predict an execution metric for an execution of the workload using the candidate; and selecting a best candidate infrastructure on which to execute the workload based on the predicted execution results.

17 Claims, 4 Drawing Sheets

(51) Int. Cl.
*G06F 11/34* (2006.01)
*G06F 16/901* (2019.01)
*G06F 18/22* (2023.01)
*G06N 3/02* (2006.01)

(52) U.S. Cl.
CPC .......... *G06F 9/4843* (2013.01); *G06F 9/4881* (2013.01); *G06F 9/50* (2013.01); *G06F 9/5005* (2013.01); *G06F 9/5027* (2013.01); *G06F 9/5055* (2013.01); *G06F 9/5083* (2013.01); *G06F 11/3409* (2013.01); *G06F 16/9024* (2019.01); *G06F 18/22* (2023.01); *G06N 3/02* (2013.01); *G06F 2209/501* (2013.01); *G06F 2209/5019* (2013.01)

(58) Field of Classification Search
CPC ...... G06F 9/5027; G06F 9/505; G06F 9/5055; G06F 9/5083; G06F 2209/501; G06F 2209/5019
See application file for complete search history.

(56) References Cited

U.S. PATENT DOCUMENTS

| | | | |
|---|---|---|---|
| 2020/0264928 A1* | 8/2020 | Kalmuk | G06F 9/5011 |
| 2020/0349482 A1* | 11/2020 | Grossman | G06F 9/4881 |
| 2020/0401947 A1* | 12/2020 | Jha | G06F 9/5027 |
| 2021/0294667 A1* | 9/2021 | Chaganti | G06F 9/5083 |
| 2022/0129316 A1* | 4/2022 | Sheoran | G06F 9/5083 |
| 2022/0342704 A1* | 10/2022 | Pinho | G06F 9/5083 |
| 2023/0017085 A1* | 1/2023 | Vera Sousa | G06F 9/5083 |

OTHER PUBLICATIONS

M. Xu, "Understanding Graph Embedding Methods and Their Applications," https:arxiv.org/pdf/2012.08019.pdf, 2020.

R. (Zhitao) Ying, Z. Lou, J. You, C. Wen, A. Canedo and J. Leskovec, "Neural Subgraph Matching," https://arxiv.org/abs/2007.03092, 2020.

\* cited by examiner

SYSTEMS AND METHODS FOR WORKLOAD PLACEMENT BASED ON SUBGRAPH SIMILARITY

BACKGROUND

Computing devices often exist in ecosystems that include any number of devices. Devices in such a device ecosystem may perform a variety of workloads. Such workloads may be performed using a portion of the device ecosystem. However, it is often challenging to determine what portion of a device ecosystem would be best for deploying a new workload instance for execution.

SUMMARY

In general, embodiments described herein relate to a method for workload placement based on subgraph similarity. The method may include obtaining a workload graph corresponding to a workload to be executed; encoding the workload graph to obtain an encoded workload graph; obtaining an encoded previous execution workload graph from a graph database management system (GDBMS) based on the encoded workload graph, wherein the encoded previous execution workload graph comprises a workload resource usage signature; obtaining an encoded infrastructure subgraph from the GDBMS corresponding to the encoded previous execution workload graph, wherein the encoded infrastructure subgraph comprises an infrastructure resource usage signature; obtaining an execution metric set associated with the encoded infrastructure subgraph from the GDBMS; making a first determination, using the execution metric set and an execution requirement set associated with the workload, that the encoded infrastructure subgraph should remain in a set of filtered encoded infrastructure subgraphs; performing, using the encoded infrastructure subgraph and the GDBMS, a subgraph similarity query to obtain a plurality of encoded infrastructure candidate subgraphs, each comprising respective current resource usage signatures; executing a machine learning (ML) prediction model using an encoded infrastructure candidate subgraph of the plurality of encoded infrastructure candidate subgraphs and an average resource usage associated with previous executions of the workload to obtain a predicted execution result; making a second determination, using the predicted execution result and the execution requirement set associated with the workload, that an execution of the workload is likely to be successful when executed on infrastructure associated with the encoded infrastructure candidate subgraph; and deploying, based on the second determination, the workload on a device ecosystem portion represented by the encoded infrastructure candidate subgraph.

In general, embodiments described herein relate to a non-transitory computer readable medium that includes computer readable program code, which, when executed by a computer processor enables, the computer processor to perform a method for workload placement based on subgraph similarity. The method may include obtaining a workload graph corresponding to a workload to be executed; encoding the workload graph to obtain an encoded workload graph; obtaining an encoded previous execution workload graph from a graph database management system (GDBMS) based on the encoded workload graph, wherein the encoded previous execution workload graph comprises a workload resource usage signature; obtaining an encoded infrastructure subgraph from the GDBMS corresponding to the encoded previous execution workload graph, wherein the encoded infrastructure subgraph comprises an infrastructure resource usage signature; obtaining an execution metric set associated with the encoded infrastructure subgraph from the GDBMS; making a first determination, using the execution metric set and an execution requirement set associated with the workload, that the encoded infrastructure subgraph should remain in a set of filtered encoded infrastructure subgraphs; performing, using the encoded infrastructure subgraph and the GDBMS, a subgraph similarity query to obtain a plurality of encoded infrastructure candidate subgraphs, each comprising respective current resource usage signatures; executing a machine learning (ML) prediction model using an encoded infrastructure candidate subgraph of the plurality of encoded infrastructure candidate subgraphs and an average resource usage associated with previous executions of the workload to obtain a predicted execution result; making a second determination, using the predicted execution result and the execution requirement set associated with the workload, that an execution of the workload is likely to be successful when executed on infrastructure associated with the encoded infrastructure candidate subgraph; and deploying, based on the second determination, the workload on a device ecosystem portion represented by the encoded infrastructure candidate subgraph.

In general, embodiments described herein relate to a system for workload placement based on subgraph similarity. The system may include a processor comprising circuitry; memory; and a workload placement device operatively connected to a graph database management system (GDBMS) and executing on the processor and using the memory. The workload placement device may be configured to obtain a workload graph corresponding to a workload to be executed; encode the workload graph to obtain an encoded workload graph; obtain an encoded previous execution workload graph from the GDBMS based on the encoded workload graph, wherein the encoded previous execution workload graph comprises a workload resource usage signature; obtain an encoded infrastructure subgraph from the GDBMS corresponding to the encoded previous execution workload graph, wherein the encoded infrastructure subgraph comprises an infrastructure resource usage signature; obtain an execution metric set associated with the encoded infrastructure subgraph from the GDBMS; make a first determination, using the execution metric set and an execution requirement set associated with the workload, that the encoded infrastructure subgraph should remain in a set of filtered encoded infrastructure subgraphs; perform, using the encoded infrastructure subgraph and the GDBMS, a subgraph similarity query to obtain a plurality of encoded infrastructure candidate subgraphs, each comprising respective current resource usage signatures; execute a machine learning (ML) prediction model using an encoded infrastructure candidate subgraph of the plurality of encoded infrastructure candidate subgraphs and an average resource usage associated with previous executions of the workload to obtain a predicted execution result; make a second determination, using the predicted execution result and the execution requirement set associated with the workload, that an execution of the workload is likely to be successful when executed on infrastructure associated with the encoded infrastructure candidate subgraph; and deploy, based on the second determination, the workload on a device ecosystem portion represented by the encoded infrastructure candidate subgraph.

Other aspects of the embodiments disclosed herein will be apparent from the following description and the appended claims.

BRIEF DESCRIPTION OF DRAWINGS

Certain embodiments discussed herein will be described with reference to the accompanying drawings. However, the accompanying drawings illustrate only certain aspects or implementations of embodiments described herein by way of example and are not meant to limit the scope of the claims.

DETAILED DESCRIPTION

Figure 1:
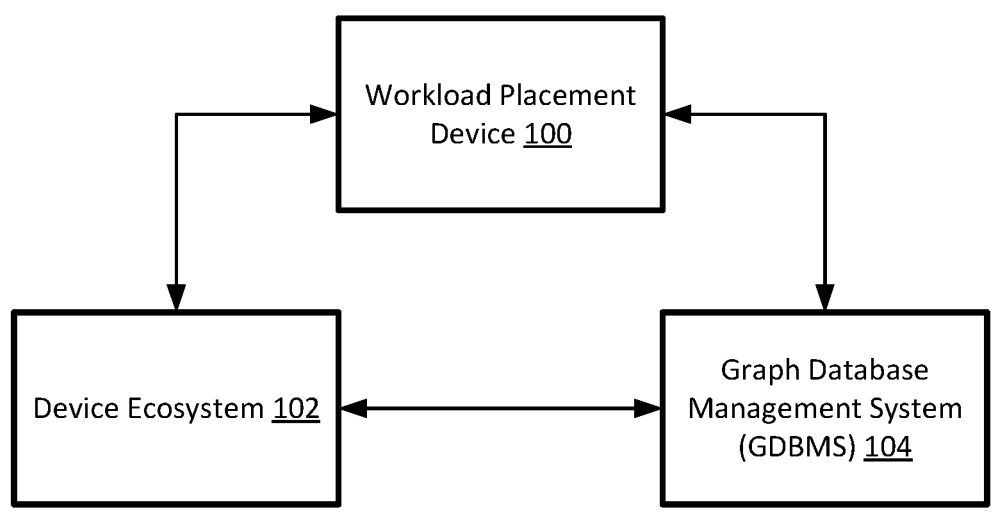
FIG. 1 shows a diagram of a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for workload placement based on subgraph similarity in accordance with one or more embodiments described herein.

In one or more embodiments, when a new instance of a workload is to be executed within a device infrastructure, a portion of the device infrastructure may be selected on which to deploy the workload for execution. In one or more embodiments, in order to select the portion of the device ecosystem on which to deploy the workload, the workload may be represented as a graph. Such a graph may include portions of the workload as nodes, and dependencies between the portions as edges. The graph may then be encoded to obtain an encoded workload graph. For example, the workload graph may be encoded as a vector representation of the graph representing the workload.

Next, in one or more embodiments, the encoded workload graph is used as a key to obtain, from a graph database management system (GDBMS), a set of previous instances of the workload and/or similar workloads that were executed within the device ecosystem. In one or more embodiments, each such instance of a previous workload execution in the GDBMS is associated in the GDBMS with an encoded previous workload execution graph that includes a workload resource signature indicating how the workload used compute resources (e.g., processor, memory, storage, network, etc.). In one or more embodiments, each such instance of a previous workload execution in the GDBMS is also associated in the GDBMS with an encoded infrastructure subgraph that includes an infrastructure resource signature indicating the overall resource usage of the infrastructure represented by the subgraph while the previous instance of the workload was being executed. In one or more embodiments, each such instance of a previous workload execution in the GDBMS is also associated in the GDBMS with an execution metric set that includes one or more metrics (e.g., workload execution time, cost of execution, average latency, input/output (I/O) throughput, etc.) that may have been used to determine if the previous execution of the workload met its associated service level agreement (SLA) defining one or more requirements associated with the workload execution instance.

Next, in one or more embodiments, an execution requirement set (e.g., requirements defined in an SLA) for the new instance of the workload to be executed is used, along with the execution metric set for the previous executions, to filter out any instances of previous workload executions that would not satisfy the execution requirement set for the new execution. Such filtering may be a strict filtering out of any previous workload execution instances that would not meet the execution requirement set, or may be a filtering out of previous executions that would be within a certain defined tolerance (e.g., 10%) of the metrics of the execution requirement set.

In one or more embodiments, the set of encoded infrastructure subgraphs remaining after the aforementioned filtering are used, along with the GDBMS, to identify a set of infrastructure candidate subgraphs. In one or more embodiments, the set of infrastructure candidate subgraphs are obtained based on being similar to one of the encoded infrastructure subgraphs. The similarity may be based both on topology and on resource usage. In the case of resource usage, the similarity determination is based on a comparison of the resource usage signature of the encoded infrastructure subgraph, and a resource signature of the infrastructure candidate subgraph.

In one or more embodiments, once a set of encoded infrastructure candidate subgraphs has been obtained, each such candidate is used as input for a machine learning (ML) model to predict an execution metric set that would result if the new workload instance is executed using the infrastructure represented by the encoded infrastructure candidate subgraph. In one or more embodiments, the ML model is also provided as input the average resource usage characteristics of all or any portion of the instances of the previous executions of the workload.

In one or more embodiments, each encoded infrastructure candidate subgraph is analyzed using the ML model. In one or more embodiments, during the executions, the predicted execution metric set for the candidate is obtained, and compared with either the execution requirement set (for the first candidate assessed), or with the current best execution metric set result previously obtained for another candidate. In one or more embodiments, if the comparison yields that the candidate being currently assessed is predicted to have an execution metric set that is better, then the candidate becomes the current leader. In one or more embodiments, after all candidates have been so assessed, the candidate predicted to have the best execution metric set, which would satisfy the execution requirement set associated with the new workload instance, is selected as the candidate infrastructure on which to deploy the new workload instance, as it is the most likely to allow the execution requirement set to be met. In one or more embodiments, once said candidate is selected, the workload is deployed. In one or more embodiments, the details of the execution (e.g., telemetry) are captured, and used to create a new entry in the GDBMS for use in servicing future workload deployment requests.

Embodiments described herein allow for efficient deployment of workloads within a device ecosystem based on an assessment of encoded subgraphs to determine a similar subgraph that represents the best candidate infrastructure on which to deploy the workload.

FIG. 1 shows a diagram of a system in accordance with one or more embodiments described herein. The system may include a workload placement device (100), a device ecosystem (102), and a GDBMS (104). Each of these components is described below.

In one or more embodiments, the device ecosystem (102) may include any number of nodes. In one or more embodiments, as used herein, a node is any computing device, collection of computing devices, portion of one or more computing devices, or any other logical grouping of computing resources. In one or more embodiments, device ecosystem may include any number of nodes, devices, components, etc. In one or more embodiments, a device ecosystem is a collection of devices, components, etc. arranged and/or operatively connected in any manner, and in which any number of workloads may be executed.

In one or more embodiments, as discussed above, a node of the device ecosystem (102) may be a computing device, a portion of a computing device, a set of computing devices, etc. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), one or more data processing units (DPUs), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or node. Other types of computing devices may be used without departing from the scope of embodiments described herein.

In one or more embodiments, the non-volatile storage (not shown) and/or memory (not shown) of a computing device or system of computing devices may be and/or include one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes a workload placement device (100). In one or more embodiments, such as the embodiment shown in FIG. 1, the workload placement device (100) is operatively connected to the device ecosystem (102). As shown in FIG. 1, a workload placement device (100) may be separate from and connected to the device ecosystem (102). Additionally or alternatively, although not shown in FIG. 1, a workload placement device (100) may be part of the device ecosystem (102) without departing from the scope of embodiments described herein. In one or more embodiments, the workload placement device (100) is a computing device (described above). The workload placement device (100), and components therein, are discussed further in the description of FIG. 2, below.

In one or more embodiments, the system also includes a GDBMS (104). In one or more embodiments, the GDBMS (104) is operatively connected to the workload placement device (100) and to the device ecosystem. The GDBMS (104) may be within the device ecosystem (102) and/or part of the workload placement device (100) without departing from the scope of embodiments described herein. In one or more embodiments, the GDBMS (104) is a computing device (described above). In one or more embodiments, the GDBMS (104) stores a data structure of any type that includes any number of entries.

As an example, the data structure may be a database, and the entries may each include an encoded workload graph representing a graph of a workload that was executed. An entry may also include an encoded previous execution workload graph and associated resource signature associated with the encoded workload graph. In one or more embodiments, the resource signature of the encoded previous execution workload graph includes information about the resource usage of the previous execution of the workload. An entry may also include an encoded infrastructure graph and associated resource signature representing the infrastructure on which a previous execution of the workload was executed. In one or more embodiments, the resource signature of the encoded infrastructure graph includes information about the overall resource usage of the infrastructure represented by the encoded infrastructure subgraph while the previous instance of the workload associated with the encoded previous execution workload graph was being executed. An entry may also include an execution metric set that includes one or more metrics relating to the previous execution of the workload, such as, for example, execution time, cost of execution, average throughput, average latency, etc. Such metrics may have been used, for example, to determine whether an execution requirement set associated with the previous workload execution was met.

The GDBMS (104) may also include a graph representation of the current infrastructure of the device ecosystem, which may be divided into any number of infrastructure subgraphs, which may each have an associated resource usage signature representing most current resource telemetry data about the current usage of the infrastructure portion represented by the subgraph.

In one or more embodiments, the workload placement device (100), the device ecosystem (102), and the GDBMS (104) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1 shows a configuration of components, other configurations may be used without departing from the scope of embodiments described herein. Accordingly, embodiments disclosed herein should not be limited to the configuration of components shown in FIG. 1.

Figure 2:
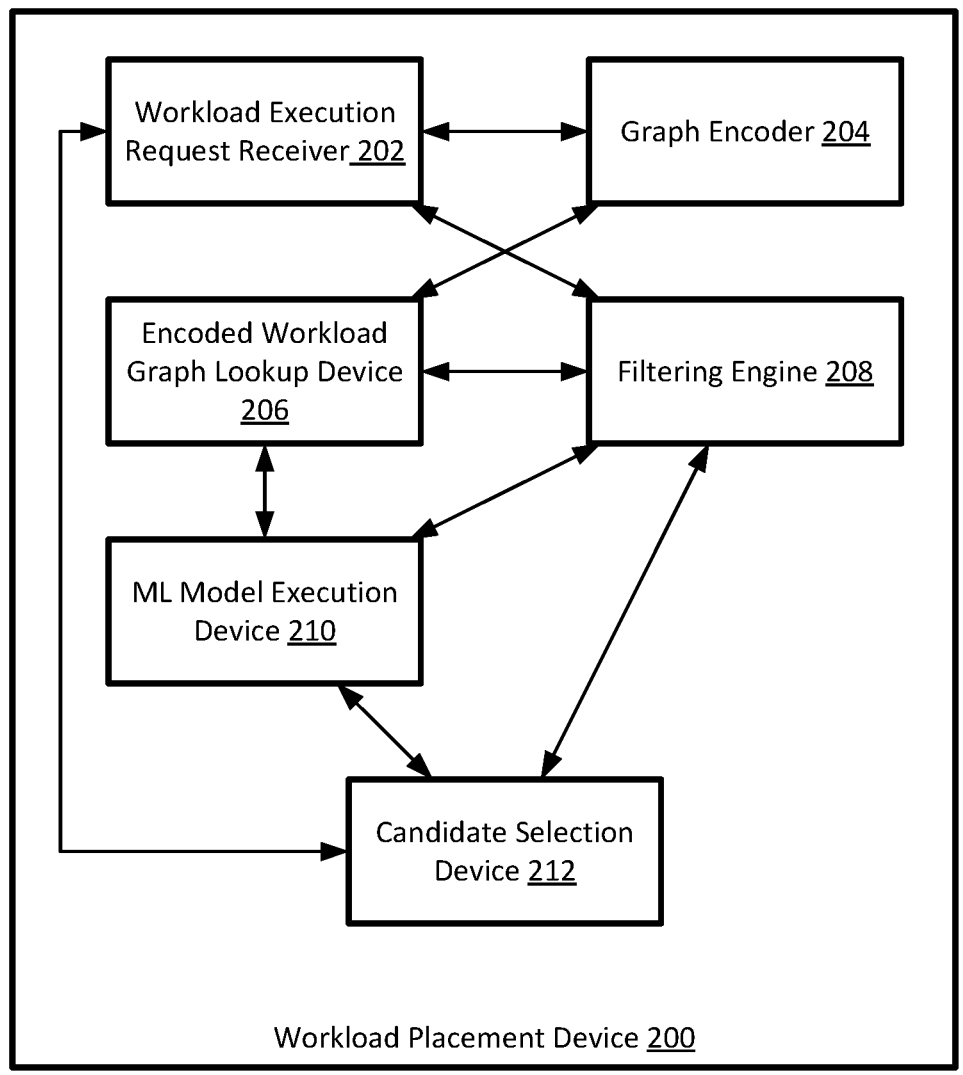
FIG. 2 shows a diagram of a workload placement device in accordance with one or more embodiments described herein.

FIG. 2 shows a diagram of a workload placement device (200) in accordance with one or more embodiments described herein. The workload placement device (200) may include any number of components. As shown in FIG. 2, the workload placement device (200) includes a workload execution request receiver (202), a graph encoder (204), an encoded workload graph lookup device (206), a filtering engine (208), a ML model execution device (210), and a candidate selection device (212). Each of these components is described below.

In one or more embodiments, a workload placement device (200) is a computing device, as discussed above in the description of FIG. 1.

In one or more embodiments, the workload placement device (200) includes a workload execution request receiver (202). In one or more embodiments, a workload execution request receiver (202) is any hardware (e.g., circuitry), software, firmware, or any combination thereof that includes functionality to receive requests to execute a workload in a device ecosystem (e.g., device ecosystem (102) of FIG. 1). In one or more embodiments, the request is received using any technique by which information may be received (e.g., from a requesting entity over a network). In one or more embodiments, a request received by the workload execution request receiver (202) includes information about the workload for which execution is requested, as well as an execution requirement set that includes one or more execution requirement metrics associated with the workload. As an example, an execution requirement set may include an execution time metric that must be met to satisfy a SLA.

In one or more embodiments, the workload placement device (200) includes a graph encoder (204) operatively connected to the workload execution request receiver (202). In one or more embodiments, graph encoder (204) is any hardware (e.g., circuitry), software, firmware, or any combination thereof that includes functionality to encode graphs representing workloads and/or infrastructure on which workloads are executed. In one or more embodiments, the graph encoder (204) includes functionality to use a workload execution request to generate a graph representing the workload to be executed, and to generate an encoded workload graph based on the workload graph. As an example, an encoded workload graph may be a vector representation of the workload graph generated using graph neural networks.

In one or more embodiments, the graph encoder (204) also includes functionality to generate encoded previous execution workload graphs, which include an encoded graph of a previous workload that was executed, along with a resource signature that includes telemetry data representing the resource usage (e.g., processor, memory, storage, network, etc.) associated with the previous execution of the workload. As an example, an encoded previous execution workload graph may be a vector representation of the workload graph of the previously executed workload along with the information of the resource signature, generated using graph neural networks.

In one or more embodiments, the graph encoder (204) also includes functionality to generate encoded infrastructure subgraphs. In one or more embodiments, an encoded infrastructure subgraph is a vector representation of the topology and resource usage of a portion of the infrastructure used in a previous workload execution, and the resource signature representing the overall resource usage of the infrastructure represented by the subgraph while the previous workload was being executed.

In one or more embodiments, the graph encoder (204) includes functionality to store all or any portion of the aforementioned encoded graphs and/or subgraphs in a GDBMS (e.g., GDBMS (104) of FIG. 1).

In one or more embodiments, the workload placement device (200) also includes an encoded workload graph lookup device (206). In one or more embodiments, the encoded workload graph lookup device (206) is any hardware (e.g., circuitry), software, firmware, or any combination thereof that includes functionality to use an encoded workload graph (e.g., generated by the graph encoder (204)) as a lookup key to obtain information from a GDBMS (e.g., GDBMS (104) of FIG. 1). Such information may include, but is not limited to, a set of encoded previous execution workload graphs that represent previous executions of the workload to be executed or similar workloads. In one or more embodiments, the lookup may be performed using any similarity determination technique (e.g., cosine distance, Euclidean distance, etc.) for determining similarity between the encoded workload graph generated by the graph encoder (204) and encoded workload graphs in the GDBMS for previous workload executions. In one or more embodiments, a similar workload is a previously executed workload for which a similarity computation relative to the workload requested for execution yields a result over a similarity threshold.

In one or more embodiments, such encoded workload graphs for previous workload executions are associated with other data in the GDBMS, which is also obtained by the encoded workload graph lookup device (206) as part of the lookup. Such other data may include encoded previous workload execution graphs that include a resource signature representing the resource usage of the workload during the previous execution. Such other information may also include an encoded infrastructure subgraph representing the infrastructure portion of a device ecosystem on which a given previous workload execution occurred, with the encoded infrastructure subgraphs also including a resource signature representing the overall resource usage by the infrastructure while the workload was previously being executed. Such other information may also include an execution metric set, which may include any metrics related to the previous execution of the workload (e.g., execution time).

In one or more embodiments, the workload placement device (200) also includes a filtering engine (208). In one or more embodiments, the filtering engine (208) is operatively connected to the workload execution request receiver (202) and the encoded workload graph lookup device (206). In one or more embodiments, the filtering engine (208) is any hardware (e.g., circuitry), software, firmware, or any combination thereof that includes functionality to filter a set of encoded infrastructure graphs obtained by the encoded workload graph lookup device (206). In one or more embodiments, the encoded infrastructure graphs obtained by the encoded workload graph lookup device (206) based on a lookup performed using an encoded workload graph generated by the graph encoder (204) are each associated with an execution metric set. In one or more embodiments, the filtering engine (208) uses said execution metric set, and an execution requirement set obtained by the workload execution request receiver (202) as part of a workload execution request, to determine if the requirements of the execution requirement set would have been met. As an example, the filtering engine may compare an execution time requirement of the execution requirement set with an execution time metric of the execution metric set for each encoded infrastructure subgraph. In one or more embodiments, if the execution metric satisfies the requirement, and/or is within a certain tolerance range of the requirement, then the encoded infrastructure subgraph being assessed is kept in the set of encoded infrastructure subgraphs to be further assessed. In one or more embodiments, if the execution metric for a given encoded infrastructure subgraph does not meet the requirement, and/or is not within a certain tolerance range of the subset, then the encoded infrastructure subgraph is discarded from the set of encoded infrastructure subgraphs to be further assessed.

In one or more embodiments, the workload placement device (200) also includes a ML model execution device (210). In one or more embodiments, the ML model execution device (210) is operatively connected to the encoded workload graph lookup device (206) and the filtering engine (208). In one or more embodiments, the ML model execution device (210) is any hardware (e.g., circuitry), software, firmware, or any combination thereof that includes functionality to execute an ML model of any type. In one or more embodiments, the ML model is an ML model that predicts at least one execution metric based on an input information set. In one or more embodiments, the input information set includes, but may not be limited to, resource usage information related to one or more encoded infrastructure candidate subgraphs (discussed below) and resource usage information of past executions of the workload to be executed. The resource usage information of past workload executions may, for example, be an average resource usage for any number of resource types during previous workload executions. The resource usage information related to infrastructure candidate subgraphs may include telemetry data about the current resource usage of the infrastructure represented by the encoded infrastructure candidate subgraph. In one or more embodiments, the result of executing the ML model is at least one execution metric that corresponds to at least one execution requirement of the execution requirement set associated with the workload for which execution is requested.

In one or more embodiments, the workload placement device (200) also includes a candidate selection device (212). In one or more embodiments, the candidate selection device (212) is operatively connected to the workload execution request receiver (202), the filtering engine (208), and the ML model execution device (210). In one or more embodiments, the candidate selection device (212) is any hardware (e.g., circuitry), software, firmware, or any combination thereof that includes functionality to select encoded infrastructure candidate subgraphs based on the filtered set of encoded infrastructure subgraphs generated by the filtering engine (208), and/or to select a best candidate on which to deploy a workload for execution based on the results generated by the ML model execution device (210). Candidate selection is discussed further in the description of FIG. 3, below.

While FIG. 2 shows a configuration of components, other configurations may be used without departing from the scope of embodiments described herein. For example, although FIG. 2 shows all components as part of the same device, any of the components may be grouped in sets of one or more components which may exist and execute as part of any number of separate and operatively connected devices. As another example, a single component may be configured to perform all or any portion of the functionality performed by the components shown in FIG. 2. Accordingly, embodiments disclosed herein should not be limited to the configuration of components shown in FIG. 2.

Figure 3:
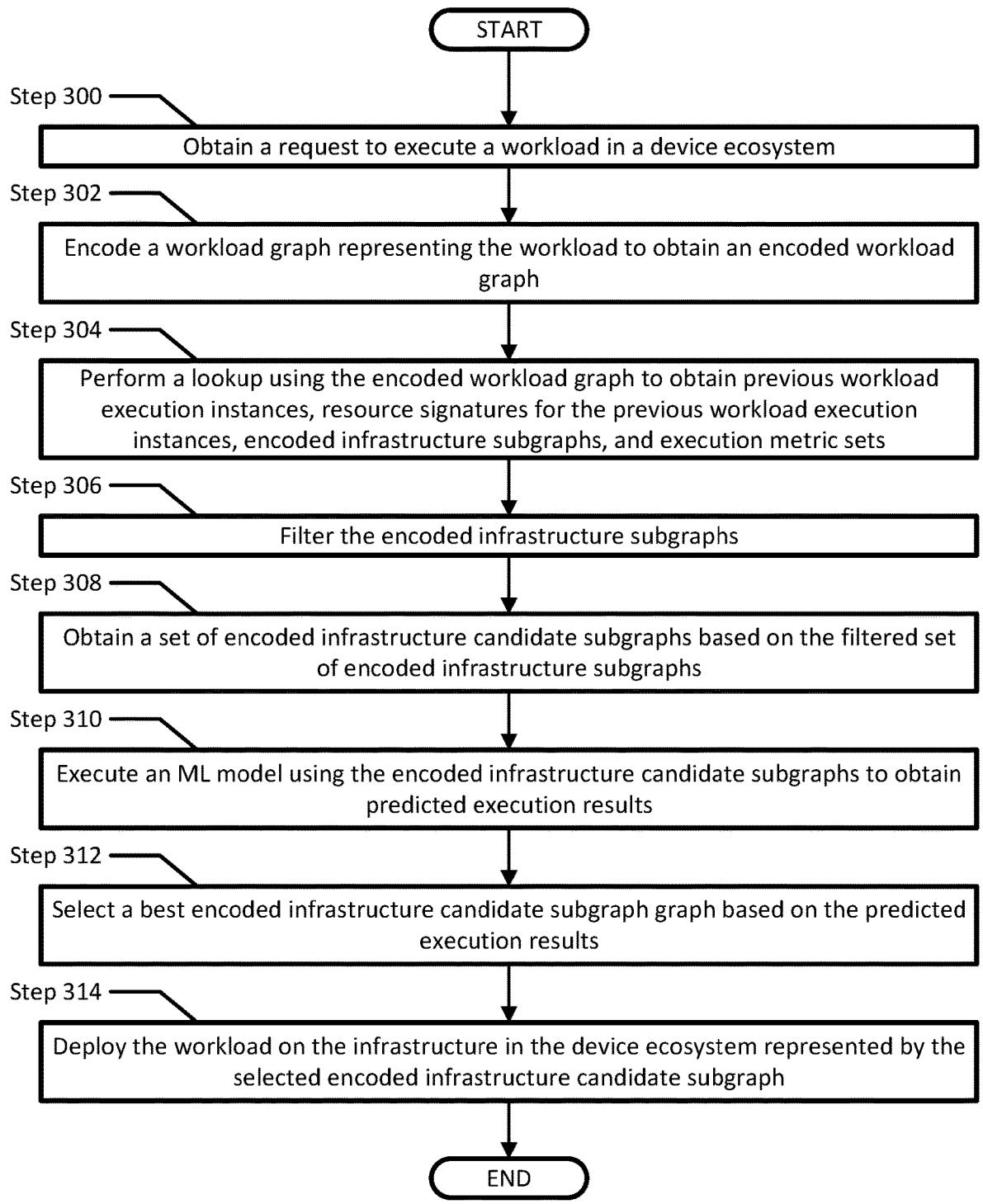
FIG. 3 shows a flowchart of a method for workload placement using subgraph similarity in accordance with one or more embodiments described herein.

FIG. 3 shows a flowchart describing a method for workload placement within a device ecosystem based on subgraph similarity in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 3.

In Step 300, a request to execute a workload within a device ecosystem is obtained. The request may be obtained by a workload placement device. The request may be obtained via any technique for obtaining and/or receiving information. As an example, the request may be received over a network connection. In one or more embodiments, the request includes information about the workload to be executed, as well as an execution requirements set. The execution requirements set may, for example, be based on an SLA that includes any number of execution metrics that should be met by the execution. As an example, the execution requirements set may include that the workload must be executed within a certain execution time, and below a certain execution cost.

In Step 302, a workload graph representing the workload for which execution is requested is encoded to obtain an encoded workload graph. In one or more embodiments, the encoded workload graph is obtained by a workload execution device. In one or more embodiments, the information about the workload received as part of the request is used to generate a workload graph representing the workload, and then the workload graph is transformed into an encoded workload graph. As an example, a graph neural network may be used to transform nodes and edges of the workload graph into a vectorial representation of the workload graph that has a lower dimensionality, such that the information of the workload graph is preserved with less information.

In Step 304, a lookup is performed using the encoded workload graph obtained in Step 302. In one or more embodiments, the lookup is performed by a workload placement device. In one or more embodiments, the lookup is performed using the encoded workload graph as a key to lookup entries corresponding to previous executions of the workload that are stored in a GDBMS. In one or more embodiments, the lookup obtains a set of entries. In one or more embodiments, each entry includes the encoded workload graph of the previously executed workload that represents the topology of the workload. In one or more embodiments, each entry also includes an encoded workload graph of the previously executed workload that represents the topology of the workload, and a resource signature that indicates the resource usage of the workload during the previous execution. In one or more embodiments, each entry also includes an encoded infrastructure subgraph representing the topology of the infrastructure portion of a device ecosystem on which the previous workload was executed and a resource signature indicating the overall resource usage of the infrastructure while the previous workload was being executed. In one or more embodiments, each entry also includes an execution metric set that includes any number of execution metrics related to the previous execution of the workload (e.g., execution time, throughput, latency, etc.). In one or more embodiments, the lookup is performed by performing a similarity computation (e.g., cosine similarity, Euclidean distance, etc.) between the encoded workload graph and the encoded previous execution workload graphs of the entries in the GDBMS.

In Step 306, the set of encoded infrastructure subgraphs obtained in Step 304 is filtered to obtain a filtered set of encoded infrastructure subgraphs. In one or more embodiments, the filtering includes comparing at least one metric of the execution metric set of a given encoded infrastructure graph with at least one metric of the execution requirement set received as part of the workload execution request in Step 300 to determine if the requirement would have been met, and/or was within a certain tolerance threshold of being met. In one or more embodiments, the filtered set of encoded infrastructure subgraphs includes only those encoded infrastructure subgraphs for which the comparison yielded that the requirement would have been met and/or was within the tolerance threshold.

In Step 308, a set of encoded infrastructure candidate subgraphs is obtained based on the filtered set of encoded infrastructure subgraphs obtained in Step 306. In one or more embodiments, the set of encoded infrastructure candidate subgraphs is obtained by performing, for each of the encoded infrastructure subgraphs, a subgraph similarity check between the encoded infrastructure subgraph and entries in the GDBMS that include encoded infrastructure subgraphs representing a current device ecosystem portion and that include a resource signature indicating a current (or most recent) resource usage associated with the subgraph infrastructure.

In Step 310, an ML model is executed for each of the encoded infrastructure candidate subgraphs obtained in Step 308. In one or more embodiments, the inputs to the ML model include the resource signature associated with an encoded infrastructure candidate subgraph, and an average resource usage of previous workload executions. In one or more embodiments, the average resource usage of previous workload executions is obtained based on the resource signatures of the encoded previous execution subgraphs obtained in Step 304 that correspond to encoded infrastructure subgraphs of the filtered encoded infrastructure subgraphs obtained in Step 306. In one or more embodiments, the output of each execution of the ML model is a predicted execution metric set (i.e., predicted execution results) that includes at least one predicted execution metric (e.g., execution time) if the workload for which execution is requested is executed using the infrastructure represented by the encoded infrastructure candidate subgraph.

In Step 312, the best encoded infrastructure candidate subgraph is selected based on the predicted execution results obtained in Step 310. In one or more embodiments, the best encoded infrastructure candidate subgraph is the one for which the best predicted execution result is obtained relative to the execution requirement set associated with the workload to be executed. As an example, the execution prediction set may include that the execution time should be 50 minutes or less. Therefore, the predicted execution result of the ML model is the predicted execution time if the workload is executed on a given infrastructure candidate. The best encoded infrastructure candidate subgraph selected, then, is the encoded infrastructure candidate subgraph corresponding to the lowest predicted execution time among all the candidates assessed, as that candidate is the most likely to have an execution time that satisfies the relevant execution requirement of the execution requirement set associated with the workload.

In Step 314, the workload for which execution was requested in Step 300 is deployed for execution on the infrastructure portion of the device ecosystem represented by the best encoded infrastructure candidate subgraph obtained in Step 312.

In one or more embodiments, although not shown in FIG. 3, telemetry data relating to the execution of the workload may be captured so that one or more new entries may be added to the GDBMS for use in servicing future workload placement requests.

Figure 4:
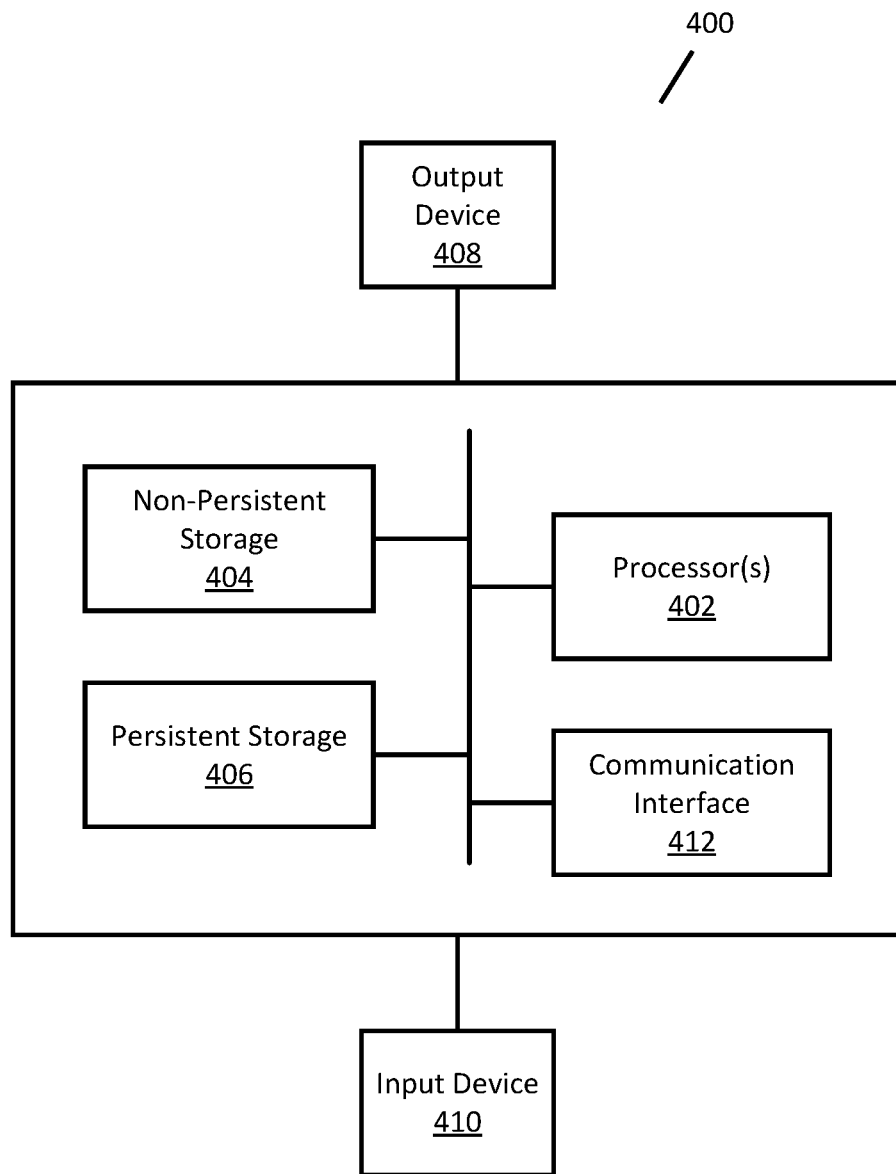
FIG. 4 shows a computing system in accordance with one or more embodiments described herein.

As discussed above, embodiments described herein may be implemented using computing devices. FIG. 4 shows a diagram of a computing device in accordance with one or more embodiments described herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one or more embodiments, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for workload placement based on subgraph similarity, the method comprising:
   obtaining a workload graph corresponding to a workload to be executed;
   encoding the workload graph to obtain an encoded workload graph;
   performing, using the encoded workload graph, a lookup to obtain a set of entries corresponding to previous executions of the workload, wherein the set of entries are stored in a graph database management system (GDBMS);
   selecting an encoded previous execution workload graph from the set of entries obtained by the lookup, wherein the encoded previous execution workload graph comprises a workload resource usage signature;
   obtaining an encoded infrastructure subgraph from the GDBMS corresponding to the encoded previous execution workload graph, wherein the encoded infrastructure subgraph comprises an infrastructure resource usage signature and an infrastructure portion of a device ecosystem on which a previous workload corresponding to the encoded previous execution workload graph was executed;
   obtaining an execution metric set associated with the encoded infrastructure subgraph from the GDBMS;
   making a first determination, using the execution metric set and an execution requirement set associated with the workload, that the encoded infrastructure subgraph should remain in a set of filtered encoded infrastructure subgraphs;
   performing, using the encoded infrastructure subgraph and the GDBMS, a subgraph similarity query to obtain a plurality of encoded infrastructure candidate subgraphs, each comprising respective current resource usage signatures, wherein each of the plurality of encoded infrastructure candidate subgraphs is obtained by computing a similarity computation relative to the workload that yields a result over a similarity threshold, wherein performing the subgraph similarity query comprises using at least one distance metric;
   executing a machine learning (ML) prediction model using an encoded infrastructure candidate subgraph of the plurality of encoded infrastructure candidate subgraphs and an average resource usage associated with previous executions of the workload to obtain a predicted execution result, wherein the predicted execution result comprises a predicted execution time;
   making a second determination, using the predicted execution result and the execution requirement set associated with the workload, that an execution of the workload is likely to be successful when executed on infrastructure associated with the encoded infrastructure candidate subgraph, wherein the predicted execution result associated with the execution of the workload that is likely to be successful has a lowest predicted execution time; and deploying, based on the second determination, the workload on a device ecosystem portion represented by the encoded infrastructure candidate subgraph.

2. The method of claim 1, wherein the execution requirement set is based on a service level agreement.

3. The method of claim 1, wherein the workload resource usage signature comprises information related to processor, memory, storage, and network resource usage.

4. The method of claim 1, wherein the encoded infrastructure subgraph is a vectorial representation of an infrastructure subgraph.

5. The method of claim 1, wherein the set of filtered encoded infrastructure subgraphs includes only encoded infrastructure subgraphs having execution metrics within a tolerance of the execution requirement set.

6. The method of claim 1, wherein the encoded workload graph, the encoded previous execution workload graph, the encoded infrastructure subgraph, and the encoded infrastructure candidate subgraph are encoded using a graph neural network.

7. A non-transitory computer readable medium comprising computer readable program code, which when executed by a computer processor enables the computer processor to perform a method for workload placement based on subgraph similarity, the method comprising:

obtaining a workload graph corresponding to a workload to be executed;

encoding the workload graph to obtain an encoded workload graph;

performing, using the encoded workload graph, a lookup to obtain a set of entries corresponding to previous executions of the workload, wherein the set of entries are stored in a graph database management system (GDBMS);

selecting an encoded previous execution workload graph the set of entries obtained by the lookup, wherein the encoded previous execution workload graph comprises a workload resource usage signature;

obtaining an encoded infrastructure subgraph from the GDBMS corresponding to the encoded previous execution workload graph, wherein the encoded infrastructure subgraph comprises an infrastructure resource usage signature and an infrastructure portion of a device ecosystem on which a previous workload corresponding to the encoded previous execution workload graph was executed;

obtaining an execution metric set associated with the encoded infrastructure subgraph from the GDBMS;

making a first determination, using the execution metric set and an execution requirement set associated with the workload, that the encoded infrastructure subgraph should remain in a set of filtered encoded infrastructure subgraphs;

performing, using the encoded infrastructure subgraph and the GDBMS, a subgraph similarity query to obtain a plurality of encoded infrastructure candidate subgraphs, each comprising respective current resource usage signatures, wherein each of the plurality of encoded infrastructure candidate subgraphs is obtained by computing a similarity computation relative to the workload that yields a result over a similarity threshold, wherein performing the subgraph similarity query comprises using at least one distance metric;

executing a machine learning (ML) prediction model using an encoded infrastructure candidate subgraph of the plurality of encoded infrastructure candidate subgraphs and an average resource usage associated with previous executions of the workload to obtain a predicted execution result, wherein the predicted execution result comprises a predicted execution time;

making a second determination, using the predicted execution result and the execution requirement set associated with the workload, that an execution of the workload is likely to be successful when executed on infrastructure associated with the encoded infrastructure candidate subgraph, wherein the predicted execution result associated with the execution of the workload that is likely to be successful has a lowest predicted execution time; and deploying, based on the second determination, the workload on a device ecosystem portion represented by the encoded infrastructure candidate subgraph.

8. The non-transitory computer readable medium of claim 7, wherein the execution requirement set is based on a service level agreement.

9. The non-transitory computer readable medium of claim 7, wherein the workload resource usage signature comprises information related to processor, memory, storage, and network resource usage.

10. The non-transitory computer readable medium of claim 7, wherein the encoded infrastructure subgraph is a vectorial representation of an infrastructure subgraph.

11. The non-transitory computer readable medium of claim 7, wherein the set of filtered encoded infrastructure subgraphs includes only encoded infrastructure subgraphs having execution metrics within a tolerance of the execution requirement set.

12. The non-transitory computer readable medium of claim 7, wherein the encoded workload graph, the encoded previous execution workload graph, the encoded infrastructure subgraph, and the encoded infrastructure candidate subgraph are encoded using a graph neural network.

13. A system for workload placement based on subgraph similarity, the system comprising:

a processor comprising circuitry;

memory; and a workload placement device operatively connected to a graph database management system (GDBMS), executing on the processor and using the memory, and configured to:

obtain a workload graph corresponding to a workload to be executed;

encode the workload graph to obtain an encoded workload graph;

perform, using the encoded workload graph, a lookup to obtain a set of entries corresponding to previous executions of the workload, wherein the set of entries are stored in a graph database management system (GDBMS);

select an encoded previous execution workload graph from the set of entries obtained by the lookup, wherein the encoded previous execution workload graph comprises a workload resource usage signature;

obtain an encoded infrastructure subgraph from the GDBMS corresponding to the encoded previous execution workload graph, wherein the encoded infrastructure subgraph comprises an infrastructure resource usage signature and an infrastructure portion of a device ecosystem on which a previous workload corresponding to the encoded previous execution workload graph was executed;

obtain an execution metric set associated with the encoded infrastructure subgraph from the GDBMS;

make a first determination, using the execution metric set and an execution requirement set associated with the workload, that the encoded infrastructure subgraph should remain in a set of filtered encoded infrastructure subgraphs;

perform, using the encoded infrastructure subgraph and the GDBMS, a subgraph similarity query to obtain a plurality of encoded infrastructure candidate subgraphs, each comprising respective current resource usage signatures, wherein each of the plurality of encoded infrastructure candidate subgraphs is obtained by computing a similarity computation relative to the workload that yields a result over a similarity threshold, wherein performing the subgraph similarity query comprises using at least one distance metric;

execute a machine learning (ML) prediction model using an encoded infrastructure candidate subgraph of the plurality of encoded infrastructure candidate subgraphs and an average resource usage associated with previous executions of the workload to obtain a predicted execution result, wherein the predicted execution result comprises a predicted execution time;

make a second determination, using the predicted execution result and the execution requirement set associated with the workload, that an execution of the workload is likely to be successful when executed on infrastructure associated with the encoded infrastructure candidate subgraph, wherein the predicted execution result associated with the execution of the workload that is likely to be successful has a lowest predicted execution time; and deploy, based on the second determination, the workload on a device ecosystem portion represented by the encoded infrastructure candidate subgraph.

14. The system of claim 13, wherein the workload resource usage signature comprises information related to processor, memory, storage, and network resource usage.

15. The system of claim 13, wherein the encoded infrastructure subgraph is a vectorial representation of an infrastructure subgraph.

16. The system of claim 13, wherein the set of filtered encoded infrastructure subgraphs includes only encoded infrastructure subgraphs having execution metrics within a tolerance of the execution requirement set.

17. The system of claim 13, wherein the encoded workload graph, the encoded previous execution workload graph, the encoded infrastructure subgraph, and the encoded infrastructure candidate subgraph are encoded using a graph neural network.

* * * * *